United States Patent [19]

Thorn et al.

[11] 4,424,761
[45] Jan. 10, 1984

[54] NOZZLE FOR COATING A DISC WITH A LUBRICANT

[75] Inventors: Joseph H. Thorn; Robert E. Jennings, both of Indianapolis, Ind.

[73] Assignee: RCA Corporation, New York, N.Y.

[21] Appl. No.: 428,590

[22] Filed: Sep. 30, 1982

[51] Int. Cl.³ .............................................. B05B 1/28
[52] U.S. Cl. .................................... 118/300; 118/301; 118/302; 118/324; 427/424; 239/110; 239/120; 239/121; 239/122; 239/592; 239/594; 239/601
[58] Field of Search .............. 118/301, 302, 300, 314, 118/324; 427/421, 424; 239/110, 120, 121, 122, 592, 594, 601

[56] References Cited

U.S. PATENT DOCUMENTS

| | | |
|---|---|---|
| 749,232 | 1/1904 | Shaw . |
| 768,095 | 8/1904 | Twist . |
| 1,272,031 | 7/1918 | Gohmert . |
| 1,852,649 | 4/1932 | Gurney . |
| 2,087,139 | 7/1937 | Cameron ........................ 239/121 X |
| 3,387,992 | 6/1968 | Arthur et al. .................... 427/424 X |
| 3,594,228 | 7/1971 | Mock ............................. 118/326 X |
| 4,309,456 | 1/1982 | Lock ............................... 427/209 |

Primary Examiner—Shrive P. Beck
Attorney, Agent, or Firm—Birgit E. Morris; Donald S. Cohen

[57] ABSTRACT

A nozzle for directing a flow of lubricant particles vertically downwardly onto the surface of a disc moving horizontally across the discharge opening of the nozzle includes a pair of side plates which are secured together by end plates to form an enclosure having a narrow discharge opening at the bottom edge. The side plates are substantially in the form of isoceles trapezoids having a bottom edge wider than its top edge and having the end plates extending between the nonparallel edges of the side plates. An inlet port is connected to the top edges of the plates. The side plates have on their inner surfaces adjacent their bottom edges a groove which extends along the bottom edges to the end plates. The grooves are adapted to catch any lubricant which flows down the inner surfaces of the side plates and direct such lubricant to the ends of the discharge opening where the lubricant can drip from the nozzle.

9 Claims, 5 Drawing Figures

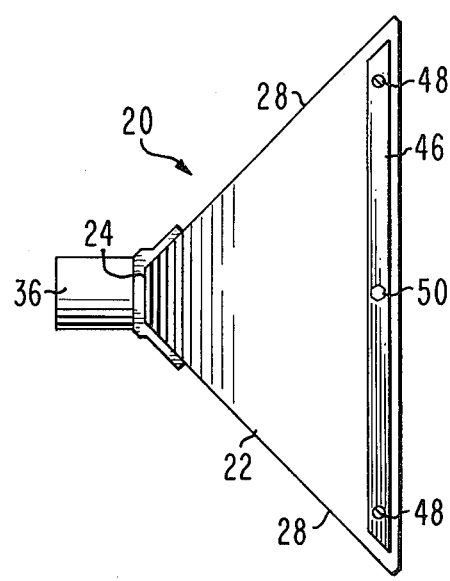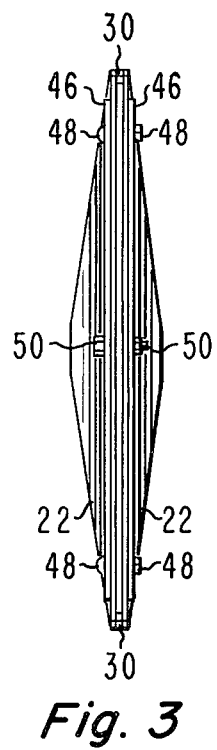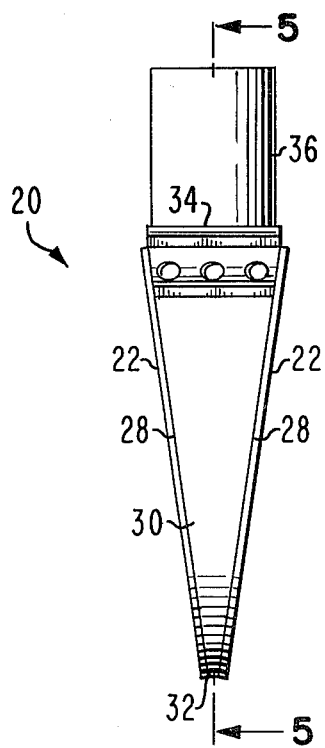
Fig. 2
Fig. 3
Fig. 4

NOZZLE FOR COATING A DISC WITH A LUBRICANT

BACKGROUND OF THE INVENTION

The present invention relates to a nozzle for coating a flat disc with a thin film of a lubricant, and more particularly to a nozzle for so coating a disc while the disc is in a horizontal position.

There has been recently developed a high density recorded disc, i.e. a video disc, in which the recorded information is in the form of a surface relief pattern formed along a spiral path on the major surface of the disc. Preferably, the surface relief pattern is formed in a spiral groove in the major surface of the disc. The recorded disc is played with a stylus which has a very fine tip which rides in the groove. In order to reduce frictional forces and to prevent wear of the stylus and/or the disc, a very thin layer, preferably between 200 and 400 Angstroms thick, of a lubricant is provided on the surface of the disc.

One apparatus and method for coating a disc with a thin layer of a lubricant is shown and described in U.S. Pat. No. 4,309,456 to B. E. Lock, issued Jan. 5, 1982, entitled "Method and Apparatus for Coating Recorded Discs With a Lubricant," which is incorporated herein by reference. In the method of this patent, droplets of the lubricant are formed in an atomizer chamber by passing streams of air through the lubricant. The air then carries the lubricant droplets from the atomizer chamber to nozzles in a coating chamber. The nozzles direct the lubricant droplets onto the surfaces of a disc which is carried between the nozzles. In the apparatus shown, the disc is in an upright vertical position and the nozzles direct the lubricant droplets horizontally onto the surface of the disc. However, it has now been found to be more desirable to have the disc in a horizontal position and arrange the nozzles to direct the lubricant droplets vertically downwardly onto the surface of the disc as the disc passes under the discharge opening of the nozzle. However, having the nozzle in a vertical position has raised a problem in that those lubricant droplets that contact the inner surface of the nozzle tend to stick to the inner surface of the nozzle. The droplets collect and coalesce, and will then flow down the inner surface of the nozzle forming large droplets that drip onto the surface of the disc. Any such large drops of the lubricant on the surface of the disc forms a much thicker film than desired and interferes with the proper playback of the disc.

SUMMARY OF THE INVENTION

A nozzle for directing a flow of a gas containing droplets of a lubricant onto the surface of the disc includes a pair of side plates each having one edge larger than an opposed edge and being connected together to form an enclosure with the larger edges of the plates being close together to form a narrow discharge opening. An inlet opening is provided into the nozzle at the shorter opposed edges of the plates. The plates are provided with means along the inner surfaces thereof adjacent the discharge opening to catch any lubricant which flows down the inner surface of the plate toward the discharge opening.

BRIEF DESCRIPTION OF THE DRAWINGS

FIG. 2 is a side elevational view of the nozzle of the present invention.

FIG. 3 is an elevational view of the discharge end of the nozzle.

FIG. 4 is an edge elevational view of the nozzle.

DETAILED DESCRIPTION OF THE PREFERRED EMBODIMENT

Figure 1:
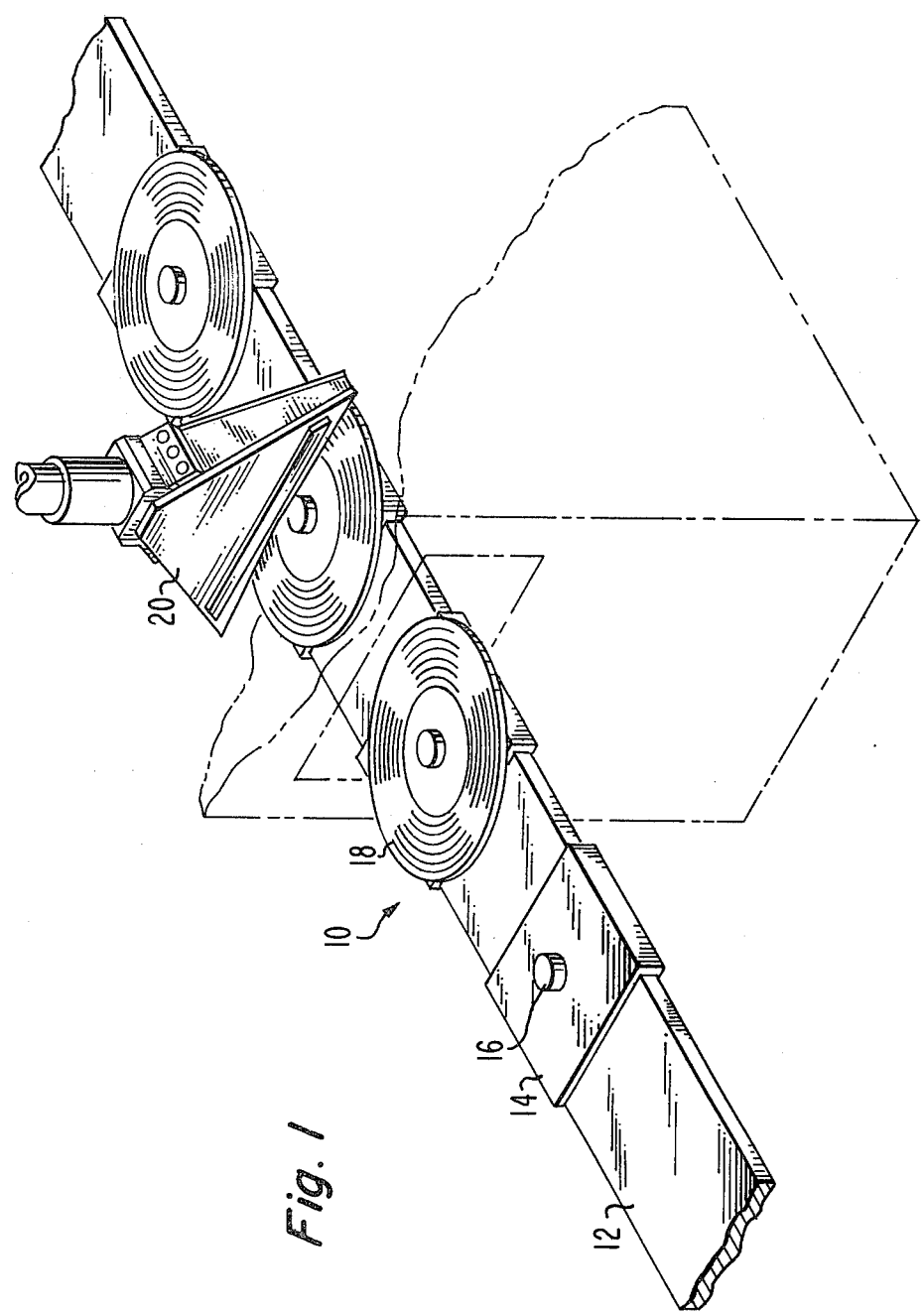
FIG. 1 is a schematic view of a coating appartus which incorporates the nozzle of the present invention.

Referring to FIG. 1, a disc coating apparatus which incorporates the nozzle of the present invention is generally designated as 10. The coating apparatus includes a horizontal conveyor 12 which can be a belt, chain, or any other type of endless conveyor. Mounted at spaced intervals along the conveyor 12 are supporting pads 14. Each of the supporting pads 14 has a cylindrical hub 16 projecting upwardly therefrom. Each of the hubs 16 is of a diameter equal to the diameter of the center hole in a disc and of a length slightly greater than the thickness of a disc. Thus, as shown in FIG. 1, a disc 18 can be seated in a horizontal position on each pad 14 with the hub 16 projecting through the center hole in the disc so that the disc 18 will be moved horizontally by the conveyor 12. Over the conveyor 12 is a nozzle 20 of the present invention. The nozzle 20 is preferably enclosed in a housing such as shown in U.S. Pat. No. 4,309,456 and is connected to an atomizer chamber such as shown in said patent.

Referring to FIGS. 2-5, the nozzle 20 of the present invention includes a pair of side plates 22 each of which is substantially in the form of an isoceles trapezoid having substantially parallel top and bottom edges 24 and 26 and non-parallel angled side edges 28. The bottom edge 26 is larger, i.e. wider, than the top edge 24 and tapers slightly upwardly toward the top edge 24 from its ends toward its middle. The bottom edge 26 instead of being tapered from its ends toward its middle could be slightly curved to achieve the same result.

The side plates 22 are fixedly secured together by end plates 30 which extend between the side edges 28 of the side plates 22. The bottom edges 32 of the end plate 30 are much narrower than the top edges 34 so that the bottom edges 26 of the side plates 22 are much closer together than the top edges 24. Thus, the side plates 22 and end plates 30 form an enclosure having an elongated, thin discharge opening along the bottom edges 26 and 32 thereof.

The top edges 24 and 34 of the side plates 22 and end plates 30 respectively are secured to an inlet port 36. The inlet port 36 has a cylindrical inlet passage 38 extending partially therethrough from its top end. The inlet passage 38 opens into a passage 40, the side wall of which curves smoothly from the inlet passage 38 to the inner surfaces of the side plates 22 and end plates 30.

Figure 5:
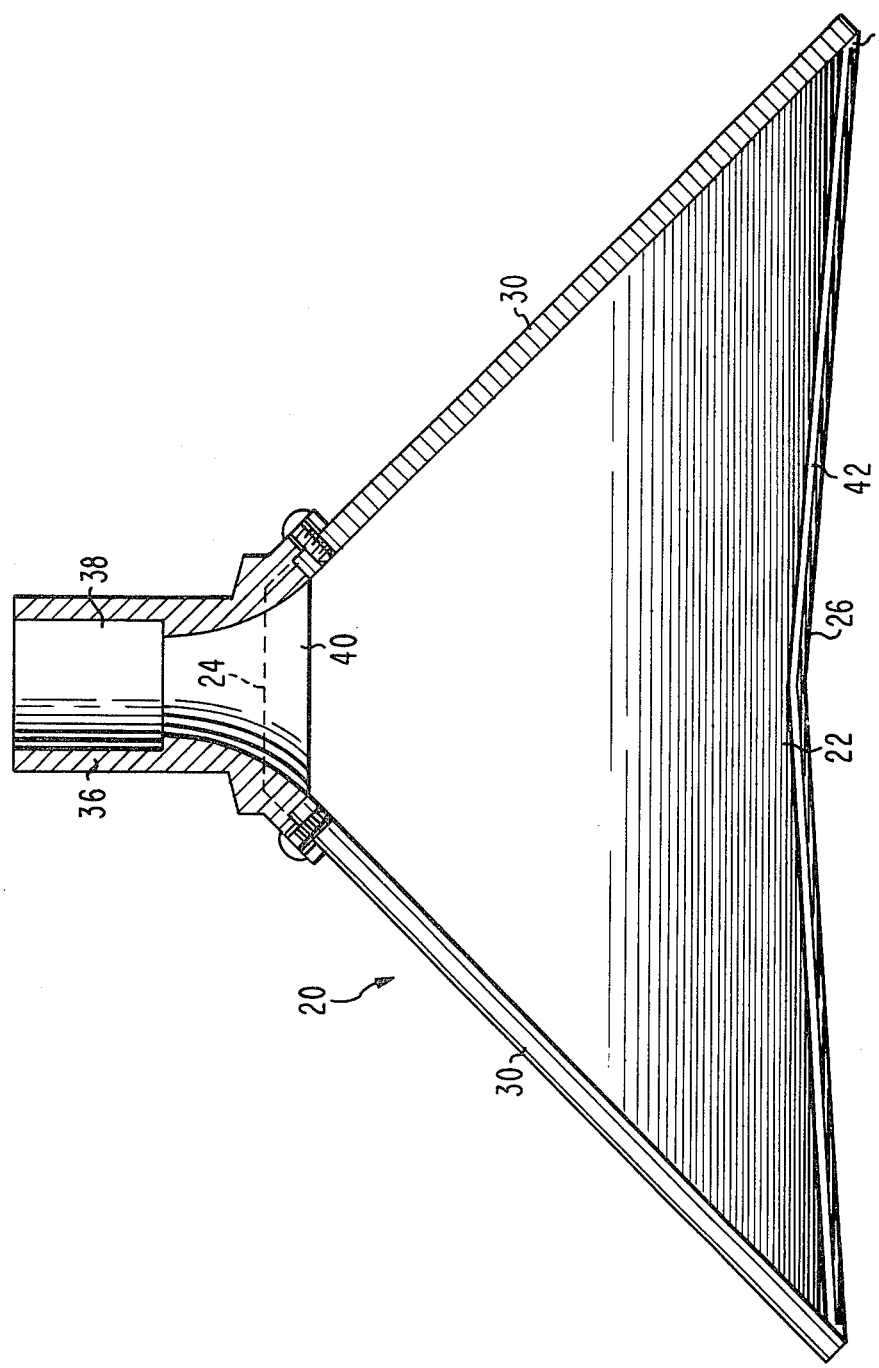
FIG. 5 is a cross-sectional view taken along line 5—5 of FIG. 4.

As shown in FIG. 5, each of the side plates 22 has a groove 42 in its inner surface. The groove 42 is slightly spaced from and extends along the bottom edge 26 of the side plate 22. At each side edge 28 of the side plate 22 the groove 42 has a portion 44 which extends downwardly to the bottom edge 26.

As shown in FIG. 2, an adjustment strip 46 extends along the outer surface of each side plate 22 adjacent the bottom edge 26 thereof. The ends of each adjustment strip are fixedly secured to its respective side plate 22, such as by screws 48. An adjustment bolt 50 is threaded through the adjustment strip 46 midway between its ends and engages the outer surface of the side plate 22. By threading the bolts 50 against the side plates 22, the side plates can be moved toward each other so as to adjust the width of the center portion of the discharge opening.

In the operation of the coating apparatus 10, the droplets of the lubricant which are formed in the atomizer chamber, such as shown in U.S. Pat. No. 4,309,456, are carried by a stream of air to the nozzle 20. The nozzle 20 directs the lubricant droplets onto the surface of the disc 18 which is being carried under the discharge opening of the nozzle by the conveyor 12. The discharge opening is longer than the diameter of the disc 18 so that the entire surface of the disc 18 is coated with the lubricant as it passes under the nozzle 20. As the lubricant droplets flow through the nozzle 20, any of the lubricant droplets which contact the inner surface of the side plates 22 will flow down the side plates to the groove 42. Such lubricant will be collected in the groove 42 and will flow along the groove 42 to the ends of the groove and will drop out of the groove 42 through the end portions 44. However, since the discharge opening is longer than the diameter of the disc 18, any of the lubricant dripping from the groove end portion 44 will not drop onto the surface of the disc. Likewise, any of the lubricant droplets which contact the inner surfaces of the end plates 30 will flow down the end plates 30 so as to drip from the discharge opening beyond the outer edge of the disc 18. Thus, the nozzle 20 of the present invention permits the coating of the discs 18 as they are in a horizontal position but prevents, or at least minimizes, large drops of the lubricant from dripping onto the surface of the disc 18 which would disrupt the achievement of a thin uniform coating of the lubricant on the surface of the disc.

We claim:

1. A nozzle for directing a flow of gas contianing droplets of a lubricant onto the surface of a disc comprising:

a pair of side plates each having one edge larger than the opposed edge, means connecting the plates together to form an enclosure with the larger edges of the plates being close together to form a narrow discharge opening, an inlet opening into the nozzle at the shorter opposed edges of the plates, and a groove in and extending along the inner surface of each of the plates adjacent the discharge opening to collect any lubricant which flows down the inner surface of the plates toward the discharge opening, each of said grooves extending along the full width of its respective plate and at each side edge of the plate extending to the larger edge of the plate.

2. A nozzle in accordance with claim 1 in which the larger edge of each side plate is closer to its shorter opposed edge at the center of the larger edge than at the ends of the side plate.

3. A nozzle in accordance with claim 2 in which the side plates are in the form of an isoceles trapezoid and are connected together by end plates which extend between the other two edges of the side plates.

4. A nozzle in accordance with claim 3 in which the end plates are in the form of an isoceles trapezoid with one of the parallel edges being wider than the other and with the shorter edge extending between the larger edges of the side plates and the shorter edges extending between the shorter edges of the side plates.

5. In an apparatus for coating a disc with a thin film of a lubricant which includes a horizontally extending conveyor, means on said conveyor for supporting a disc in a horizontal position and a nozzle mounted over said conveyor for directing a flow of lubricant droplets vertically downwardly onto the surface of a disc as the disc passes beneath the nozzle, the improvement comprising:

said nozzle including a pair of side plates each having spaced top and bottom edges with the bottom edges being wider than the top edge, said side plates being connected together in spaced relation to form an enclosure having a narrow discharge opening along the bottom edges of the side plates, an inlet port at the top edge of the side plates and a groove in and extending along the inner surface of each of the side platets adjacent the bottom edges to collect any lubricant which may flow down the inner surfaces of the side plate toward the discharge opening each of the grooves extending along the full width of its respective side plate and at each side edge of the side plate extending downwardly to the bottom edge of the side plate.

6. An apparatus in accordance with claim 5 in which the bottom edge of each of the side plates is longer than the diameter of a disc to be coated.

7. An apparatus in accordance with claim 5 in which the bottom edge of each side plate extends upwardly toward the top edge of the side plate from the side edges of the side plate to the center of the bottom edge.

8. An apparatus in accordance with claim 5 in which each of the side plates is substantially in the form of an isoceles trapezoid having nonparallel side edges and the side plates are connected together by end plates which extend between the side edges of the side plates.

9. An apparatus in accordance with claim 8 in which each of the end plates is in the form of an isoceles trapezoid with one of the parallel edges being wider than the other and the shorter edges extend between the bottom edges of the side plates and the wider edges extend between the top edges of the side plates.

* * * * *